US008307870B2

(12) United States Patent
Itoyama et al.

(10) Patent No.: US 8,307,870 B2
(45) Date of Patent: Nov. 13, 2012

(54) HEAT PLATE UNIT AND DOUBLE FACER FOR FABRICATING DOUBLE-FACED CORRUGATED FIBERBOARD

(75) Inventors: Tadashi Itoyama, Hiroshima (JP); Hiroshi Ishibuchi, Hiroshima (JP); Toshinao Okihara, Mihara (JP); Kazuhito Ohira, Mihara (JP); Takashi Nitta, Mihara (JP)

(73) Assignee: Mitsubishi Heavy Industries Printing & Packing Machinery, Ltd., Mihara-Shi (JP)

( * ) Notice: Subject to any disclaimer, the term of this patent is extended or adjusted under 35 U.S.C. 154(b) by 36 days.

(21) Appl. No.: 13/126,656

(22) PCT Filed: Nov. 25, 2009

(86) PCT No.: PCT/JP2009/069842

§ 371 (c)(1),
(2), (4) Date: May 12, 2011

(87) PCT Pub. No.: WO2010/061841

PCT Pub. Date: Jun. 3, 2010

(65) Prior Publication Data

US 2011/0209862 A1 Sep. 1, 2011

(30) Foreign Application Priority Data

Nov. 25, 2008 (JP) ................................ 2008-299886

(51) Int. Cl.
*B32B 37/00* (2006.01)

(52) U.S. Cl. ...... 156/359; 156/470; 156/580; 156/583.5

(58) Field of Classification Search .................. 156/205, 156/210, 359, 470, 580, 581, 583.1, 583.5
See application file for complete search history.

(56) References Cited

U.S. PATENT DOCUMENTS 4,556,444 A * 12/1985 Schommler .................. 156/359
5,183,525 A 2/1993 Thomas
5,417,394 A 5/1995 Knorr et al.
5,662,765 A 9/1997 Titz et al.

(Continued)

FOREIGN PATENT DOCUMENTS

JP H01-269526 10/1989

(Continued)

*Primary Examiner* — James Sells

(74) *Attorney, Agent, or Firm* — Manabu Kanesaka; Kenneth M. Berner; Benjamin J. Hauptman

(57) ABSTRACT

A double facer that fabricates a corrugated fiberboard and that includes heat plate units having thin walls aims at improving the heat conductive efficiency to fiberboard sheets in order to enhance responsibility to the setting temperature and concurrently avoiding thermal deformation of the heat plates due to a difference in temperature between the top surface and the bottom surface. The heat plate unit for fabricating a double-faced corrugated fiberboard included in a double facer that fabricates a double-faced corrugated fiberboards by gluing a single-faced corrugated fiberboard in a swath form and a linerboard together, the heat plate, being horizontally disposed and having a top surface on which the single-faced corrugated fiberboard in a swath form and the linerboard overlapping and being glued together travels, includes: a rib 32, disposed on a bottom surface of a heat plate 31, extending in a width direction of the heat plate 31, being coupled to the heat plate 31 to form an integrated body, and being capable of thermal expansion; and temperature controlling means that controls a temperature of the heat plate 31 and a temperature of the rib 32 independently of each other.

9 Claims, 7 Drawing Sheets

U.S. PATENT DOCUMENTS

| | | | | |
|---|---|---|---|---|
| 6,110,095 | A | 8/2000 | Finke et al. | |
| 6,470,294 | B1 * | 10/2002 | Taylor | 702/172 |
| 7,424,901 | B2 | 9/2008 | Ishibuchi et al. | |
| 7,669,629 | B2 * | 3/2010 | Ishibuchi et al. | 156/351 |
| 7,699,084 | B2 | 4/2010 | Ishibuchi et al. | |
| 8,057,621 | B2 * | 11/2011 | Kohler | 156/205 |
| 2010/0186896 | A1 | 7/2010 | Itoyama et al. | |

FOREIGN PATENT DOCUMENTS

| | | | |
|---|---|---|---|
| JP | H02-48329 | | 4/1990 |
| JP | H05-177750 | | 7/1993 |
| WO | WO 03/066319 | A1 | 8/2003 |
| WO | WO 2008/102662 | A1 | 8/2008 |

* cited by examiner

HEAT PLATE UNIT AND DOUBLE FACER FOR FABRICATING DOUBLE-FACED CORRUGATED FIBERBOARD

RELATED APPLICATIONS

The present application is National Phase of International Application No. PCT/JP2009/069842 filed Nov. 25, 2009, and claims priority from, Japanese Application No. 2008-299886, filed Nov. 25, 2008, the disclosure of which is hereby incorporated by reference herein in its entirety,

TECHNICAL FIELD

The present invention relates to heat plate units installed in a double facer that fabricates double-faced corrugated fiberboards and a double facer equipped with the heat plate units.

BACKGROUND TECHNIQUE

A corrugator that fabricates corrugated fiberboards fabricates a single-face corrugated fiberboard by gluing a corrugated medium and a linerboard together and completes a double-faced corrugated fiberboard by further gluing the single-faced corrugated fiberboard and a top linerboard together. In gluing in a double facer, the single-faced corrugated fiberboard and the top linerboard are previously heated by preheaters immediately before the gluing using a glue.

For example, FIG. 8 is a side view of a typical double facer. As illustrated in FIG. 8, a single-face corrugated fiberboard 3 fabricated through gluing a linerboard (bottom linerboard) 1 and a corrugated medium 2 together by a non-illustrated single facer disposed upstream is preheated by a preheater 11 and is transferred to a double facer 10 after a gluing device 12 applies raw starch solution to the peaks of the corrugated medium 2. In the meantime, a top linerboard 4 is drawn out of a rolled fiberboard 4A mounted on a mill roll stand 20 and is transferred to the double facer 10 after being preheated by a preheater 13.

The double facer 10 includes a heat plate group 14 consisting of a number of heat plate units 14A, having respective horizontal heating surface, arranged in series along the directions, and allows a single-face corrugated fiberboard 3 and a top linerboard being overlaid with the single-face corrugated fiberboard 3, to travel thereon. As shown in FIG. 9, the heat plate group 14 includes a vapor chamber which is supplied with heating vapor by proper means and includes a top surface 21*a* serving as a dissipating surface for the single-face corrugated fiberboard 3 and the top linerboard 4 (hereinafter collectively called the fiberboard sheet 5A), so that the fiberboard sheet 5A is heated by receiving heat from the top surface 21*a*.

As illustrating FIG. 8, over the heat plate group 14, there are disposed an upper belt conveyer 16 and a lower belt conveyer 17, which are extending to downstream of the heat plate group 14. On the backside of the upper belt conveyer 16 at the portion over the heat plate group 14, a pressure device 15 is disposed which presses the single face corrugated fiberboard 3 and the top linerboard 4 by means of, for example, air pressure device or rolls from the top. The wording "flatness" means the magnitude of an gap of a geometrical plane and a surface of a machine part that must be flat, and takes a value representing a minimum distance of two planes both of which are parallel with the representative plane and in which all the points on a measuring surface assigned are existing.

Downstream of the heat plate group 14 and the pressure device 15, a lower roller group 18 that supports the backside of the lower belt conveyer 17 and an upper roller group 19 that is disposed on the backside of the upper belt conveyer 16 are disposed, so that the fiberboard sheet is transferred being interposed between the upper and lower belt conveyers 16 and 17 and being pressed by the upper roller group 19.

The fiberboard sheet introduced between the heat plate group 14 and the pressure device 15 of the double facer 10 travels on the heat plate group 14, being pressed by the upper roller group 19 from the top and thereby, heated by the heat plate group 14. Being heated by the heat plate group 14, the raw starch solution applied to the peaks of the corrugated medium 2 of the single-face corrugated fiberboard 3 is gelatinized so that the adhesion caused from the gelatinization glues fiberboard sheet 5A to thereby fabricate a double-faced corrugated fiberboard 5. The fiberboard sheet 5A travels fast as high as, for example, 300 m/minute and passes through the traveling face of the double facer only for a few seconds.

The double-faced corrugated fiberboard 5 fabricated through the above manner is sandwiched by the upper belt conveyer 16 and the lower belt conveyer 17 from the top and the bottom and then transferred to the subsequent process.

Here, the heating vapor to be supplied to the vapor chamber 21 of the heat plate group 14 normally has a saturated vapor pressure of 1.0-1.3 MPa and a temperature of 180-190° C. The amount of heat and the amount of pressure to be applied to fiberboard sheet 5A on the heat plate group 14 control the adhesion of the fiberboard sheet 5A. Shortage in the amount of heat or pressure to be applied lowers the adhesion and conversely, excess in the amount of heat or pressure to be applied lowers the quality of the double-faced corrugated fiberboard 5 due to flutes formed low.

The heat plate group 14 has to have a width corresponding to the maximum width of a fiberboard traveling thereon and the width normally has a width of 1900-2600 mm. Furthermore, the heat plate group 14 has to uniformly apply heat to the fiberboard sheet 5A and therefore has flatness of 0.1 mm or less, which means high accuracy. In addition, the vapor chamber 21 needs a strength to endure the pressure (1.0-1.3 MPa) of the vapor to be supplied inside thereof, and therefore, each heat plate unit 14A needs to have a bulkhead (rigidity) having a thickness of about 30 mm.

Thickening the bulkhead of the heat plate unit 14A lowers heat conductive efficiency from the vapor in the vapor chamber 21 to the fiberboard sheet 5A. If the temperature of the bulkhead of the heat plate comes to be outside the predetermined temperature range, an amount of heat lacks or exceeds. However, it has been difficult to inhibit such temperature deviation. For the above, a conventional heat plate unit 14A has a bulkhead made of cast iron and having a thickness of about 150 mm with the intention that the bulkhead has a large heat capacity so that the temperature of the bulkhead less varies.

This solution has a problem of low responsibility to the requirement of sharply rising and lowering the temperature caused by variation in a rate of adhering of the fiberboard sheet 5A or variation in kind of paper sheet constituting the fiberboard sheet 5A. Consequently, the adhered portion of the single-face corrugated fiberboard 3 and the top linerboard 4 comes into a state of excessively dried due to excess in heat amount or of incompletely dried due to shortage in heat amount, which causes inferior adhering due to apparent adhering or causes warp of the fabricated corrugated fiberboard. Furthermore, such low responsibility hinders the fiberboard sheet 5A from traveling faster and the productivity cannot be problematically improved.

Adjustment of the temperature of heating the fiberboard sheet 5A is also accomplished by varying a pressure that the pressure device 15 applies to the fiberboard sheet 5A so that the contacting heat transferring efficiency between the fiberboard sheet 5A and the top surface of the heat plate is adjusted. However, such adjustment of the heating temperature that depends on the pressure requires the pressure to vary in a wide range of from a lower state to a higher state. In applying a high pressure to the fiberboard sheet 5A, elements of the pressure device 15 deforms in the width direction of the sheet, which makes it difficult to apply uniform pressure in the sheet width direction to the fiberboard sheet 5A. This unevenness of the pressure causes unevenness of the temperature in the sheet width direction to warp the fiberboard sheet 5A, lowering the quality of the resultant double-faced corrugated fiberboard 5.

In contrast, when the heat plate unit 14A is thinned in such a range that the heat plate unit 14A can endure the pressure of the inside of the vapor chamber 21, no problem related to the strength thereof is caused, but the temperature of the top surface of the heat plate unit 14 lowers as much as an amount of heat that has heated the fiberboard sheet 5A so that the difference in temperature between the top side of the heat plate whose temperature lowers and the bottom side whose temperature does not lower causes the heat plate unit 14A to warp to form a downward convex toward the bottom side heat which is not removed by the fiberboard sheet 5A, as shown in FIG. 10. Therefore, this cause warp of the fiberboard sheet 5A along the width direction, also lowering the quality of the resultant double-faced corrugated fiberboard 5.

To solve the foregoing problems, Patent Literature 1 discloses, in the specification and the drawings, a configuration of a heat plate in which providing many parallel holes through which heating medium is supplied inside the bulkhead of the heat plate to thin the bulkhead between the holes and the surface on which sheets travel. This configuration enhances and also equalizes the heat dissipating efficiency to the surface on which sheets travel and facilitates the adjustment of heating. FIG. 5 of Patent Literature 1 discloses a heat-plate structure having a number of reinforcing ribs on the bottom side of the heat plate.

Patent Literature 2 discloses a technique in which a heat plate is thinned and many stays that prevent the heat plate form thermal deformation are provided to the bottom side of the heat plate so that the rigidity of the stays prevents thin heat plate from warping.

Patent Literature 3 discloses a technique in which providing many parallel holes through which heating medium is supplied inside the bulkhead of the heat plate to thin the bulkhead between the holes and the surface on which sheets travel and concurrently, many ribs are provided to the bottom side of the heat plate, and holes through which heating medium is supplied are also provided to the ribs. The heating medium in the holes of the heat plate is supplied to the holes of the ribs, so that the temperature of both the heat plate and the ribs is concurrently adjusted.

[Patent Literature 1] The specification and a drawing (FIG. 5) of Japanese Utility-Model Laid-Open Publication No, HEI 2-48329

[Patent Literature 2] U.S. Pat. No. 5,417,394

[Patent Literature 3] U.S. Pat. No. 5,183,525

DISCLOSURE OF INVENTION

[Problems to be Solved by Invention]

The technique of above Patent Literature 2 fixes the heat plate to the structure via the stays and thereby inhibits the heat plate itself from thermally deforming. However, this requires deformation restricting elements, such as the stays and the structure, to be extremely rigid and in addition, even if such deformation restricting elements are rigid, the elements also thermally deforms. Therefore, to deal with thermal deformation of the heat plate under various states, the connection of the heat plate with the stay needs to be adjusted for each state. Nevertheless, it is difficult to completely prevent the heat plate from thermal deformation.

In contrast, the techniques of Patent Literatures 1 and 3 each aim at preventing the heat plate from thermal deforming by adjusting the temperature of the heat plate through the use of a heating medium. Therefore, these techniques less strains the heat plate as compared to a technique forcibly prohibiting thermal deformation of the heat plate through the use of deformation restricting elements and are efficient in view of enhancing the responsibility to the temperature of the heat plate and concurrently avoiding the warp of the heat plate.

In particular, the technique of Patent Literature 3 inhibits warp of the heat plate by passing a heating medium through the inside of the heat plate and thereby equalizing the temperature distribution along the thickness direction of the heat plate. Furthermore, the technique of Patent Literature 3 concurrently passes the same heating medium as that passing through the heat plate through the inside of the ribs such that the temperature of the ribs matches that of the heat plate. This configuration can inhibit the deformation of the heat plate caused by the temperature difference between the ribs and the heat plate.

However, the endothermic properties of paper sheets are different with the kinds of paper sheet, which differs the heat taken by a paper sheets with the kinds of paper sheets and also with the traveling rate of the paper sheet or with the temperature to which the paper sheet is set to be heated. In addition, since the thermal boundary conditions of the heat plate are different from those of the ribs, the temperature of the heating medium to be supplied to the heat plate and the ribs needs to be changed in accordance with the circumstance. The technique of Patent Literature 3 can equalize the distribution of the temperature of the heating plate in the thickness direction only by means of the temperature of the heating medium circulating inside the heat plate and the velocity of circulating the heating medium. Therefore, it is impossible to equalize the temperature distribution of the heat plate in the thickness direction under various states. Accordingly, even the technique of Patent Literature cannot completely and satisfactorily inhibit warp of the heat plate.

With the foregoing problems in view, the object of the present invention is to provide a heat plate unit and a double facer for fabricating a double-faced corrugated fiberboard, which improve the responsibility to the temperature setting by thinning the heat plate to enhance the heat conductive efficiency from the top surface of the heat plate to a fiberboard sheet traveling on the top surface also by suppressing thermal deformation of the heat plate due to a temperature difference between the surface (top surface) contacting with the fiberboard sheet and the other surface (bottom surface) within an allowable range under various conditions, so that the heat plate can be inhibited from warping.

[Means to Solve the Problem]

To attain the above objects, there is provided a heat plate unit for fabricating a double-faced corrugated fiberboard included in a double facer that fabricates a double-faced corrugated fiberboards by gluing a single-faced corrugated fiberboard in a swath form and a linerboard together, the heat plate, being horizontally disposed and having a top surface on which the single faced corrugated fiberboard in a swath form and the linerboard overlapping and being glued together travels, including: a rib, disposed on a bottom surface of a heat plate, extending in a width direction of the heat plate, being coupled to the heat plate to form an integrated body, and being capable of thermal expansion; and temperature controlling means that controls a temperature of the heat plate and a temperature of the rib independently of each other.

Preferably, the heat plate unit may include a number of ribs disposed in parallel on the bottom surface at intervals and the total value of second geometrical moment of inertia in the vertical direction of the plurality of ribs may be set to be larger than that of the heat plate.

Further preferably, the rib may have a length in the vertical direction twice the thickness of the heat plate or more.

Further preferably, the heat plate and the rib may be casted into the integrated body.

Still further preferably, the temperature controlling means may include heating medium passages for circulating a heating medium, disposed inside the heat plate and the rib, and a heating medium supplying and emitting device that supplies and emits the heating medium to and from the heating medium passages of the heat plate and the rib; and the heating medium supplying and emitting device may be capable of controlling the temperature of the heat plate and the temperature of the rib independently of each other by controlling a state of the supplying the heating medium.

In this case, the heating medium may be vapor; the heating medium supplying and emitting device may include a vapor inlet passage that supplies the heating medium passages with the vapor, a first pressure adjusting valve that adjusts a pressure of vapor that is to be supplied from the vapor inlet passage to the heating medium passage inside the heat plate, and a second pressure adjusting valve that adjusts a pressure of vapor that is to be supplied from the vapor inlet passage to the heating medium passage inside the rib.

Still further preferably, the temperature controlling means is connected to a database that stores material condition and production condition of the double-faced corrugated fiberboard and an association of optimum target temperatures of the heat plate and the rib that inhibit warp of the double-faced corrugated fiberboard with the material condition and the production condition); and the temperature controlling means may include target temperature setting means that upon input of the material condition and the production condition, sets the target temperatures with reference to the association stored in the database, and temperature adjusting means that adjusts the temperatures of the heat plate and the rib on the basis of the target temperatures set by the target temperature setting means.

In the above case, the heat plate unit may further include temperature detecting means that detects the temperature of the heat plate and the temperature of the rib, wherein the temperature controlling means carries out feedback control based on the temperatures of the heat plate and the rib detected by the temperature detecting means such that the temperatures of the heat plate and the rib approach the respective target temperatures.

Further preferably, the temperature controlling means may be connected to a database that stores an amount of deforming corresponding to warp of the heat plate and optimum temperatures of the heat plate and the rib or optimum amounts of controlling temperature affecting factor that causes the amount of deforming of the heat plate to the target value that inhibits the warp of the heat plate in association with each other; the temperature controlling means may include heat-plate deforming amount detecting means that detects the amount of deforming of the heat plate; and the temperature controlling means may control, on the basis of the amount of deforming detected by the heat-plate deforming amount detecting means, the temperatures of the heat plate and the rib by the temperatures or the amounts of controlling the temperature affecting factors that causes the amount of deforming of the heat plate to approach the target value with reference to the association stored in the database.

Still further preferably, the heat plate unit may further include heat-plate deforming amount detecting means that detects an amount of deforming of the heat plate, wherein the temperature controlling means carries out feedback control such that the amount of deforming of the heat plate detected by the heat-plate deforming amount detecting means approaches a predetermined target value.

Still further preferably, the temperature controlling means is connected to a database that stores material condition and production condition of the double-faced corrugated fiberboard and association of optimum amounts of controlling respective temperature affecting factors of the heat plate and the rib that inhibit warp of the double-faced corrugated fiberboard with the material condition and the production condition; and the temperature controlling means may include control amount setting means that, upon input of the material condition and the production condition, sets the amounts of controlling the respective temperature affecting factors with reference to the association stored in the database, and temperature affecting factor controlling means that controls the temperature affecting factors of the heat plate and the rib on the basis of the control amounts set by controlling amount setting means.

There is provided a double facer of the present invention including a heat plate unit for fabricating a double-faced corrugated fiberboard defined in any one of claims 1 through 9.

[Effect of Invention]

According to the heat plate unit for fabricating a double-faced corrugated fiberboard and the double facer including the heat plate of the present invention, the rigidity of one or more ribs disposed on the bottom surface of the heat plate inhibits the heat plate from warping. In particular, the ribs are capable of thermal expansion, and the temperature of the ribs can be controlled independently of control of the temperature of the heat plate. With this configuration, the warp of the heat plate can be positively inhibited by controlling the temperature of the ribs, to allow the ribs to expand or shrink according to the temperature.

For example, lowering the temperature of the top surface from which heat is taken by single-face corrugated fiberboard and a linerboard generates stress such that the bottom surface of the heat plate equipped with the ribs warps to form downward convex. Under this state, if the temperature is lowered such that the ribs shrink, the presence of the ribs generates a stress in a direction opposite to the warp of the heat plate. Balancing the stress that warps the heat plate and an opposite stress of the ribs can prevent the heat plate from warping.

Setting total value of second geometrical moment of inertia in the vertical direction of the plurality of ribs to be larger than that of the heat plate causes to a stress generated from thermal shrinkage or expansion according to the temperature of the ribs to surely prevent the heat plate from warping. In particular, it is possible to prevent the heat plate from warping when the temperature of the ribs is not largely varied.

Setting a length of each rib in the vertical direction twice the thickness of the heat plate or more makes it easier to guarantee the second geometrical moment of inertia in the vertical direction of the rib. In particular, it is possible to prevent the heat plate from warping when the temperature of the ribs is not largely varied.

A simple processing method of casting allows the heat plate and the ribs to be formed into an integrated form, which allows smooth stress propagation between the heat plate and the ribs. With this configuration, the warp of the heat plate can be surely inhibited by propagating a stress generated due to thermal expansion or shrinkage according to the temperature of the ribs.

According to the heat plate unit for fabricating a double-faced corrugated fiberboard and a double facer including the heat plate unit, states (temperatures or amounts of supply) of supplying the heating medium to the respective heating medium passages inside the heat plate and the ribs can easily control the temperatures of the heat plate and the ribs, so that it is surely possible to prevent the heat plate from warping.

The pressure of vapor serving as the heating medium to be supplied to the heat plate and the ribs is adjusted by the first and the second pressure adjusting valve, so that the respective temperatures of the vapor to be supplied can be easily adjusted. Consequently, the temperatures of the heat plate and the ribs can be adjusted by a simple operation and can prevent the heat plate from warping with ease.

It is possible to surly inhibit the double-faced corrugated fiberboard from warping according to the material condition and the production condition with ease by setting the optimum target temperatures of the heat plate and the ribs to inhibit the double-faced corrugated fiberboard from warping under the material condition and the production condition with reference to the database prepared beforehand and by adjusting the temperatures of the heat plate and the ribs to the target temperatures.

Feedback control based on the detected temperatures of the heat plate and the rib such that the temperatures of the heat plate and the ribs are adjusted to the target temperatures enables the temperatures of the heat plate and the ribs to more surely approach the respective target temperatures, so that the warp of the double-faced corrugated fiberboard can be surely inhibited with ease.

Otherwise, an amount of deforming of the heat plate and optimum temperatures of the heat plate and the rib or optimum amounts of controlling temperature affecting factor that causes the amount of deforming of the heat plate to the target value that inhibits the warp of the heat plate are stored in a database in association with each other. With reference to the database, the temperatures of the heat plate and the rib or the amounts of controlling the temperature affecting factors that cause the detected amount of deforming of the heat plate to approach the target value are calculated and the temperature of the heat plate and the ribs is controlled. Consequently, an amount of warp of the heat plate can be surely adjusted to inhibit the double-faced corrugated fiberboard from warping with ease.

Feedback control performed such that the amount of deforming of the heat plate detected by the heat-plate deforming amount detecting means approaches a predetermined target value can surely adjust an amount of warp of the heat plate and can surely inhibit the double-faced corrugated fiberboard from warping with ease.

Optimum amounts of controlling respective temperature affecting factors of the heat plate and the rib that inhibit warp of the double-faced corrugated fiberboard are determined according to material condition and production condition with reference to the database prepared beforehand, and the temperature affecting factors of the heat plate and the ribs are controlled on the basis of the determined amounts of controlling. With this configuration, it is possible to surely inhibit the double-faced corrugated fiberboard from warping in accordance with the material condition and the production condition with ease.

DESCRIPTION OF REFERENCE NUMBER

Figure 1A:
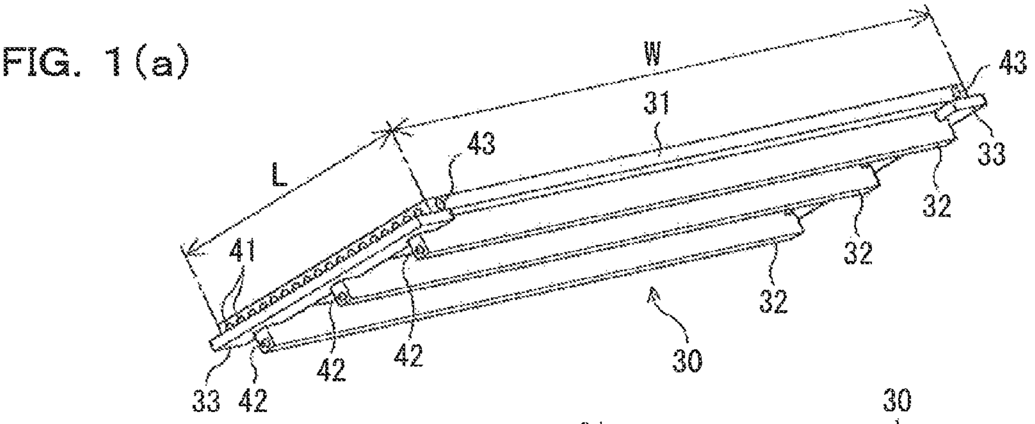
[FIG. 1] A diagram illustrating the configuration of a heat plate unit: according to a first embodiment of the present invention, FIG. 1(*a*) being a perspective view and FIG. 1(*b*) being a side view of the main part thereof.

1 bottom linerboard
2 corrugated medium
3 single-face corrugated fiberboard
4 top linerboard
4A rolled fiberboard
5 double-faced corrugated fiberboard
5A fiberboard sheet (single-face corrugated fiberboard 3 and top linerboard 4)
10 double facer
11,13 preheater
12 gluing device
14 heat plate group
14A heat plate unit
15 pressure device
16 upper belt conveyer
17 lower belt conveyer
18 lower roller group
19 upper roller group
20 mill roll stand
21 vapor chamber
21*a* top surface of the vapor chamber 21
30 heat plate unit
31 heat plate
31*a* dissipating face
32 rib
33 edge member
40 temperature controlling means
40A vapor inlet/outlet device (heating medium supplying and emitting device)

41,42 heating medium passage
43,44 vapor inlet passage
45,46 vapor outlet passage
50A,50B,50C,50D controller
51 control amount setting means
52 temperature affecting factor controlling means (temperature affecting factor)
53 target temperature setting means
53*a* target value setting means
53*b* deviation calculating means
54,54C,54D temperature adjusting means
60A,60B,60C,60D database
61,62 temperature sensor (temperature measuring means) (temperature detecting means))

[Best Mode to Carry Out Invention]

Hereinafter, the embodiments of the present invention will now be described with reference to the accompanying drawings.

First Embodiment:

To begin with, referring to drawings, a first embodiment of the present invention will now be described.

Figure 1B:
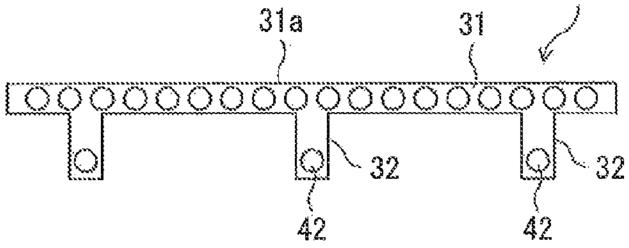
Figure 2:
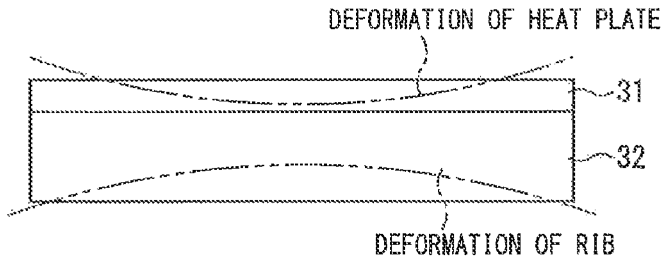
[FIG. 2] A schematic diagram illustrating an object of ribs on heat plate unit of the first embodiment seen along a sheet traveling direction.
Figure 3:
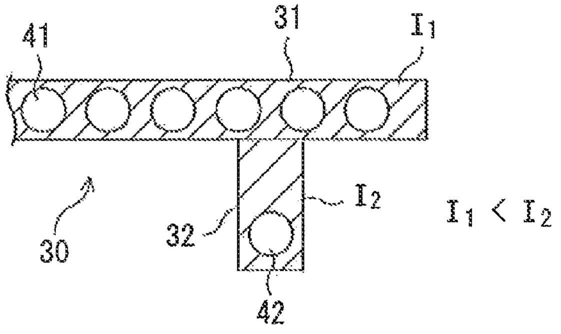
[FIG. 3] A side view illustrating the rigidity of the main part of a heat plate unit of the first embodiment.
Figure 8:
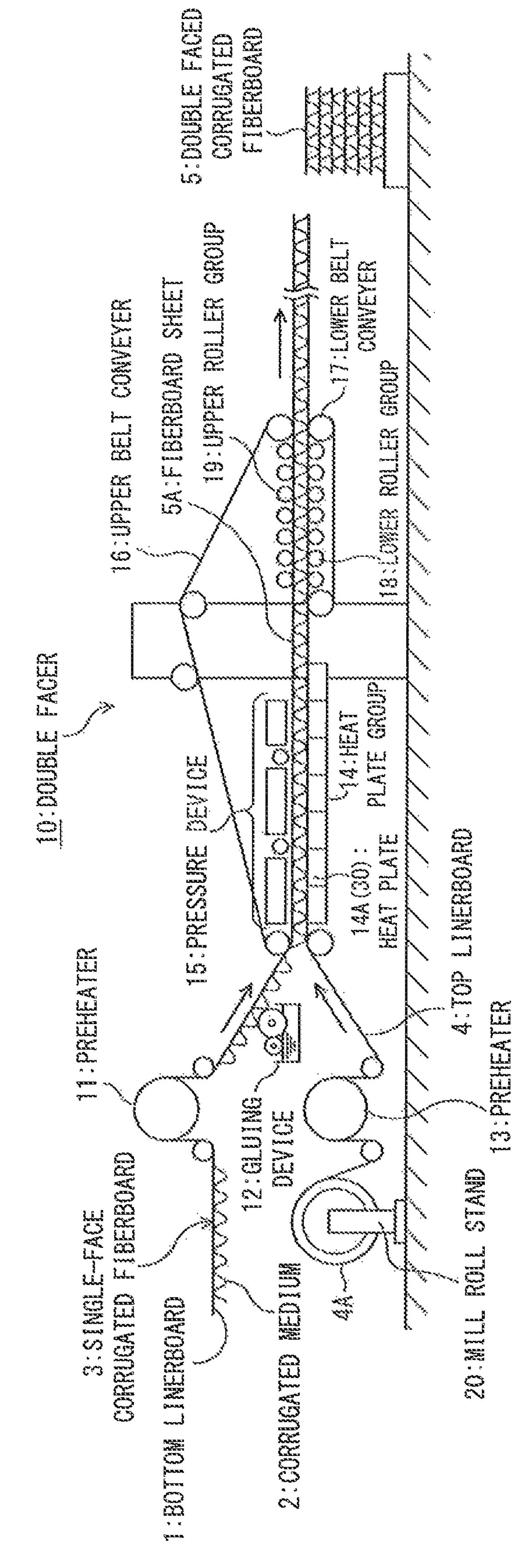
[FIG. 8] A diagram illustrating the configuration of a typical double facer.
Figure 9:
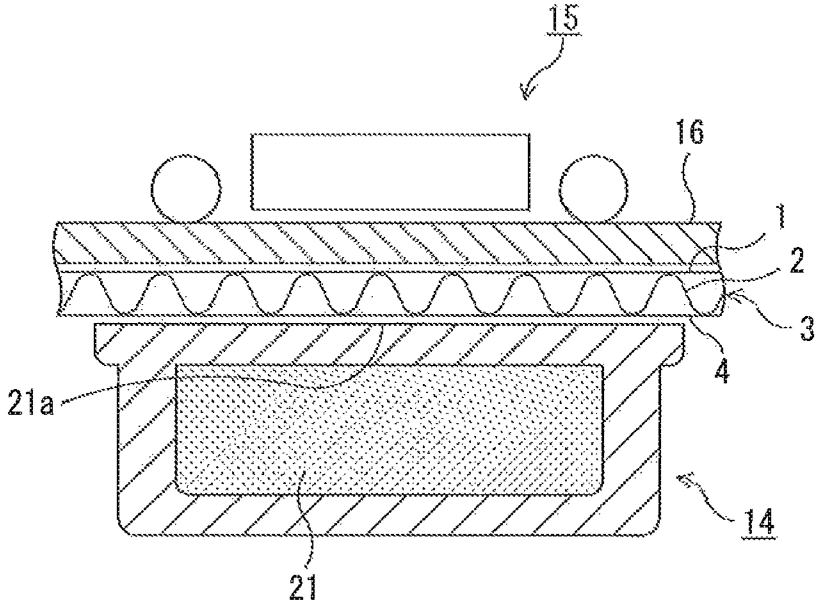
[FIG. 9] A sectional view of a heat plate unit of a double facer related to Background Technique.
Figure 10:
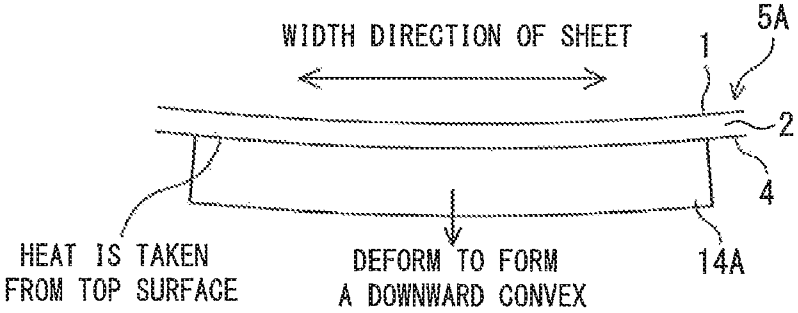
[FIG. 10] A schematic view of a heat plate unit and a fiberboard seen from the sheet traveling direction for describing a problem to be solved by the present invention.

FIGS. 1-4 are diagrams illustrating heat plate units according to the first embodiment: FIG. 1 is a perspective view (FIG. 1(*a*)) and a side view of the main part (Fig, 1(b)); FIG. 2 is a side view of the main part of a heat plate unit explaining the rigidity thereof; FIG. 3 is a diagram explaining the intention of the rib; and F*ig*. 4 is a diagram illustrating the configuration of a temperature controlling mechanism of the heat plate unit. The double facer has the same configuration as that described in the Background Art except for the heat plate unit, so the entire configuration thereof is described with reference to FIG. 8. Each heat plate unit is represented by reference number 30, which is in a bracket in FIG. 8.

(Double Facer)

The double facer according to the first embodiment, as illustrated in F*ig*. 8, is provided with a single-face corrugated fiberboard 3 which is fabricated through gluing a linerboard (bottom linerboard) 1 and a corrugated medium 2 together by a non-illustrated single facer disposed upstream and which is preheated by a preheater 11, is also provided with a top linerboard 4 which is drawn out of a rolled fiberboard 4A mounted on a mill roll stand 20, and which is preheated by a preheater 13, and fabricates a double-faced corrugated fiberboard 5 by gluing the single-face corrugated fiberboard 3 and the top linerboard 4 together.

The double facer 10 includes a heat plate group 14 consisting of a number of heat plate units 30 arranged in series along the horizontal direction to form a horizontal heating surface, and allows a single-face corrugated fiberboard 3 and a top linerboard 4, being overlaid with the single-face corrugated fiberboard 3, to travel thereon. Each heat plate unit 30 of the heat plate group 14 has a top surface serving as a dissipating surface for the overlaid single-face corrugated fiberboard 3 and the top linerboard 4 (hereinafter collective called the fiberboard sheet 5A), so that the fiberboard sheet 5A is heated by receiving heat from the top surface.

Over the heat plate group 14, there are disposed an upper belt conveyer 16 and a lower belt conveyer 17, which are extending to the downstream of the heat plate group 14. On the backside of the upper belt conveyer 16 at the portion over the heat plate group 14, a pressure device 15 is disposed which presses the single-face corrugated fiberboard 3 and the top linerboard 4 by means of air pressure device or roils from the top. Downstream of the heat plate group 14 and the pressure device 15, a lower roller group 18 that supports the lower belt conveyer 17 from the backside and a upper roller group 19 that is disposed on the backside of the upper belt conveyer are disposed, so that the fiberboard sheet is transferred, being interposed between the upper and lower belt conveyers 16 and 17 and being pressed by the upper roller group 19.

The fiberboard sheet 5A introduced between the heat plate group 14 and the pressure device 15 of the double facer 10 travels on the heat plate group 14, being pressed by the upper roller group 19 from the top and thereby, is heated by the heat plate group 14. Being heated by the heat plate group 14, the raw starch solution applied to the peaks of the corrugated medium 2 of the single-face corrugated fiberboard 3 is gelatinized so that the adhesion caused from the gelatinization glues fiberboard sheet 5A to fabricate a double-faced corrugated fiberboard 5. The fiberboard sheet 5A travels fast as high as, for example, 300 m/minute and passes through the traveling face of the double facer only for a few seconds.

The double-faced corrugated fiberboard 5 fabricated through the above manner is sandwiched by the upper belt conveyer 16 and the lower belt conveyer 17 from the top and the bottom and then transferred to the subsequent process.

(Heat Plate Unit)

The heat plate unit 30 of the first embodiment includes, as illustrated in FIG. 1(*a*), a heat plate 31 in the form of a plate having, on the top thereof, a dissipating face 31*a* that heats the fiberboard sheet 5A, and a number of ribs 32 disposed on the bottom of the heat plate 31, extending over the width direction of the heat plate 31 (corresponds to the width direction of the fiberboard sheet 5A) and being integrated with the heat plate 31. The ribs 32 each have a long rectangular section in a direction which comes to be the vertical direction when the heat plate unit 30 is installed, and are disposed on the bottom of the heat plate 31 so as to have intervals. In the first embodiment, edge members 33 are disposed on the both edges in the width direction of the heat plate 31 extending along a sheet traveling direction (i.e., in the direction that the fiberboard sheet 5A travels) and are each coupled to a non-illustrated supporting member, so that the heat plate 31 is supported.

In the first embodiment, the heat plate unit 30 is formed by concurrently casting the heat plate 31 and the ribs 32 using the same material (cast iron), and therefore the heat plate 31 and the ribs 32 initially take an integrated form. However, as an alternative, the ribs 32 may be formed separately from the heat plate 31 and then integrated with the heat plate 31 by tightly coupling these elements. In this case, the heat plate 31 may be made of a different material from that of the ribs 32, but the ribs 32 require the following conditions.

Specifically, the ribs 32 require properties of thermal expansion, that is, expand when being heated and shrink when being cooled, and also rigidity confrontable with that of the heat plate 31. These conditions are related to the principle that prohibits or inhibits warp of the heat plate 31.

Namely, when the dissipating face 31*a* heats the fiberboard sheet 5A, the temperature of the dissipating face 31*a* declines and therefore the heat plate 31 has a temperature distribution that is lower at the top side of the dissipating face 31*a* and higher at the bottom side, so that a stress is generated that the heat plate unit 30 warps to form a downward convex as shown in FIG. 2. Since the heat plate unit 30 has a short length L (normally 600-1000 mm) in the direction that the fiberboard sheet 5A travels and a wide width W (normally 1900-2600 mm) in the width direction the fiberboard sheet 5A, warp in the travel direction of the fiberboard sheet 5A scarcely affects the quality of a double-faced corrugated fiberboard 5 to be fabricated, but warp in the width direction of the fiberboard sheet 5A largely affects the quality of the double-faced corrugated fiberboard 5 to be fabricated.

For the above, in order to prohibit or inhibit the heat plate 31 from warping in the form of a downward convex in the width direction, a stress is generated, which causes each rib 32 to conversely warp to form an upward convex as shown by the two-dotted lines in FIG. 2, intending that the stress that causes the heat plate 31 to warp to form a downward convex is cancelled by the stress generated on each rib 32. This is the principle of prohibiting or inhibiting the heat plate unit 30 from warping.

Realizing this principle requires to generate a stress having an appropriate magnitude to cause each rib 32 to warp to form an upward convex. Furthermore, because the stress that causes the heat plate 31 to warp to form a downward convex varies with various conditions, the stress that causes each rib 32 to warp to form an upward convex has to be adjustable. The heat plate unit 30 of first embodiment focuses on the properties of thermal expansion of the ribs 32 and the heat distribution of each rib 32 is controlled to become uneven in the direction that the rib 32 warps (i.e., in the vertical direction). Thereby, a stress corresponding to the thermal distribution is generated on the ribs 32, so that the stress that causes the heat plate 31 to warp to form a downward convex is cancelled.

However, the temperature of the ribs 32 is actually adjustable in a limited range. Therefore, if the ribs 32 are low in rigidity, the ribs 32 each cannot obtain a stress for sufficiently warping to prevent the heat plate 31 from warping in the form of a downward convex.

For this reason, the ribs 32 are required to have rigidities confrontable with that of the heat plate 31.

As illustrated in FIG. 3 the first embodiment sets the second geometrical moment of inertia $I_2$ in the vertical direction of each rib 32 to be larger than the first geometrical moment of inertia $I_1$ of a region of the heat plate 31 that the rib 32 covers, so that the ribs 32 have a rigidity confrontable with that of the heat plate 31. In other words, the total value of second geometrical moment of inertia $I_2$ in the vertical direction of the respective rib 32 is set to be larger than the first geometrical moment of inertia $I_1$ in the vertical direction of the entire heat plate 31. Since the heat plate 31 and the ribs 32 are made of the same material and therefore have the same You modulus, the rigidities are adjusted on the basis of the setting of second geometrical moment of inertia in the vertical direction. Alternatively, if the heat plate 31 and the ribs 32 are made of different materials and therefore have different Young's moduli, the rigidities may be adjusted by both second geometrical moment of inertia in the vertical direction and Young's moduli.

In order to ensure the second geometrical moment of inertia $I_2$ of each rib 32, the rib 32 is set to have a length in the vertical direction at least twice the thickness of the heat plate 31 or more.

Figure 4:
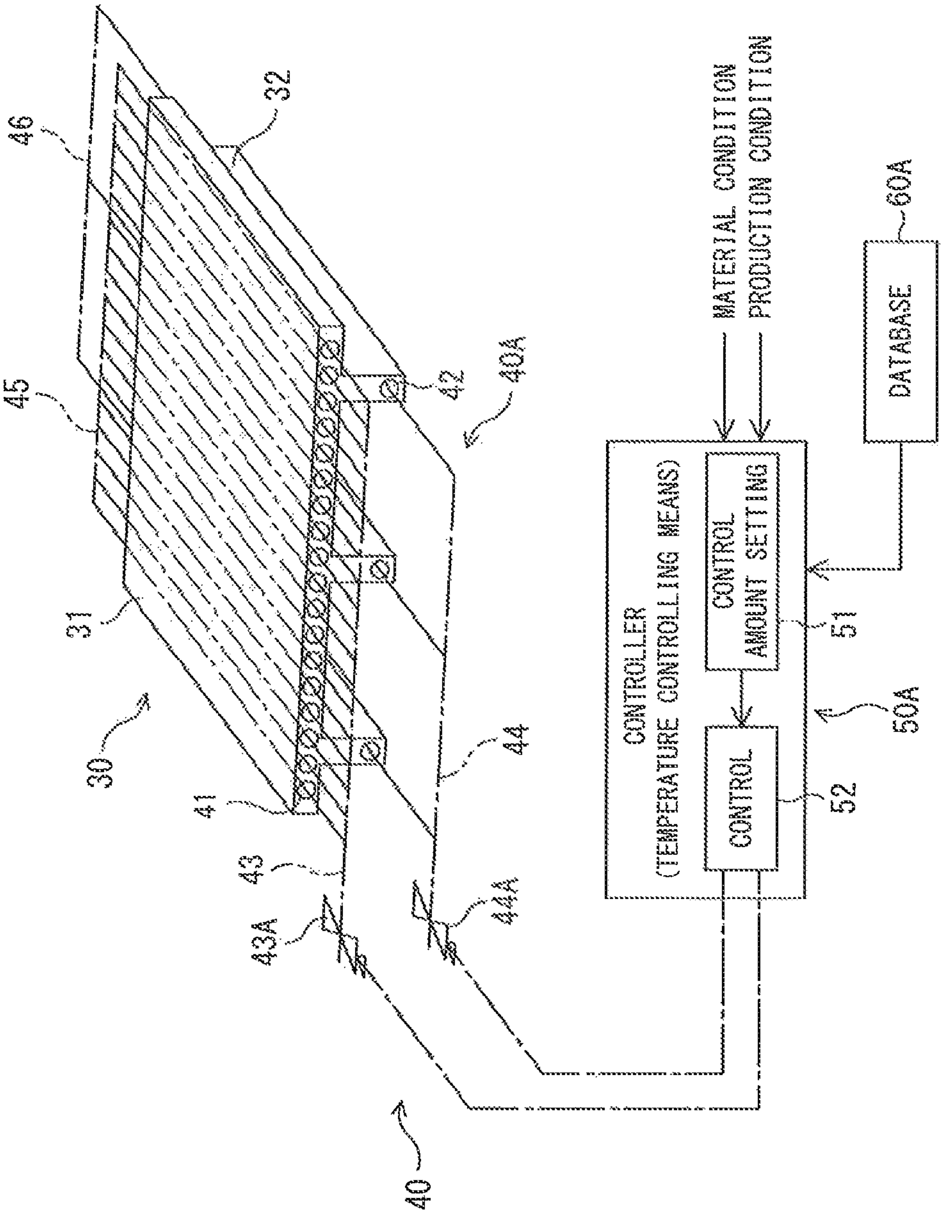
[FIG. 4] A diagram illustrating the configuration of a temperature controlling mechanism of the heat plate unit of the first embodiment.

In order to adjust the temperatures of the heat plate 31 and the ribs 32, there are provided: heating medium passages 41 and heating medium passages 42 inside the heat plate 31 and the ribs 32, respectively, through which vapor (e.g., water vapor) serving as heating medium passes as shown in FIG. 1; and inside or outside of the heat plate 31, vapor inlet passages 43 and 44 through which vapor is supplied to the heating medium passages 41 and 42, and vapor outlet passages 45 and 46 through which the vapor passing through the heating medium passage 41 and 42 emits, as shown in FIG. 4.

Fourth Embodiment:

Next, a fourth embodiment of the present invention will now be described with reference to a drawing.

Figure 6:
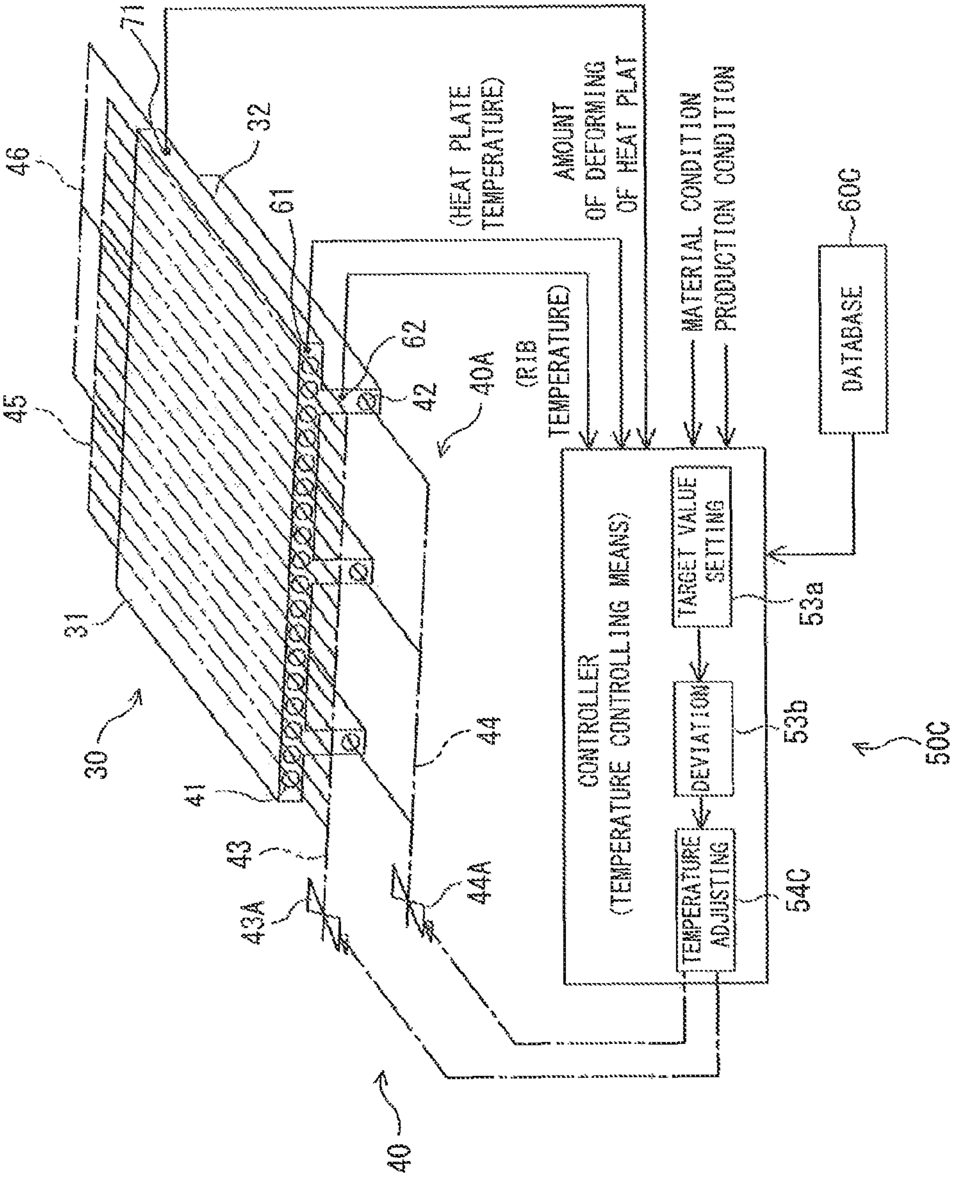
[FIG. 6] A diagram illustrating the configuration, of a temperature controlling mechanism of the heat plate unit of a third embodiment.
Figure 7:
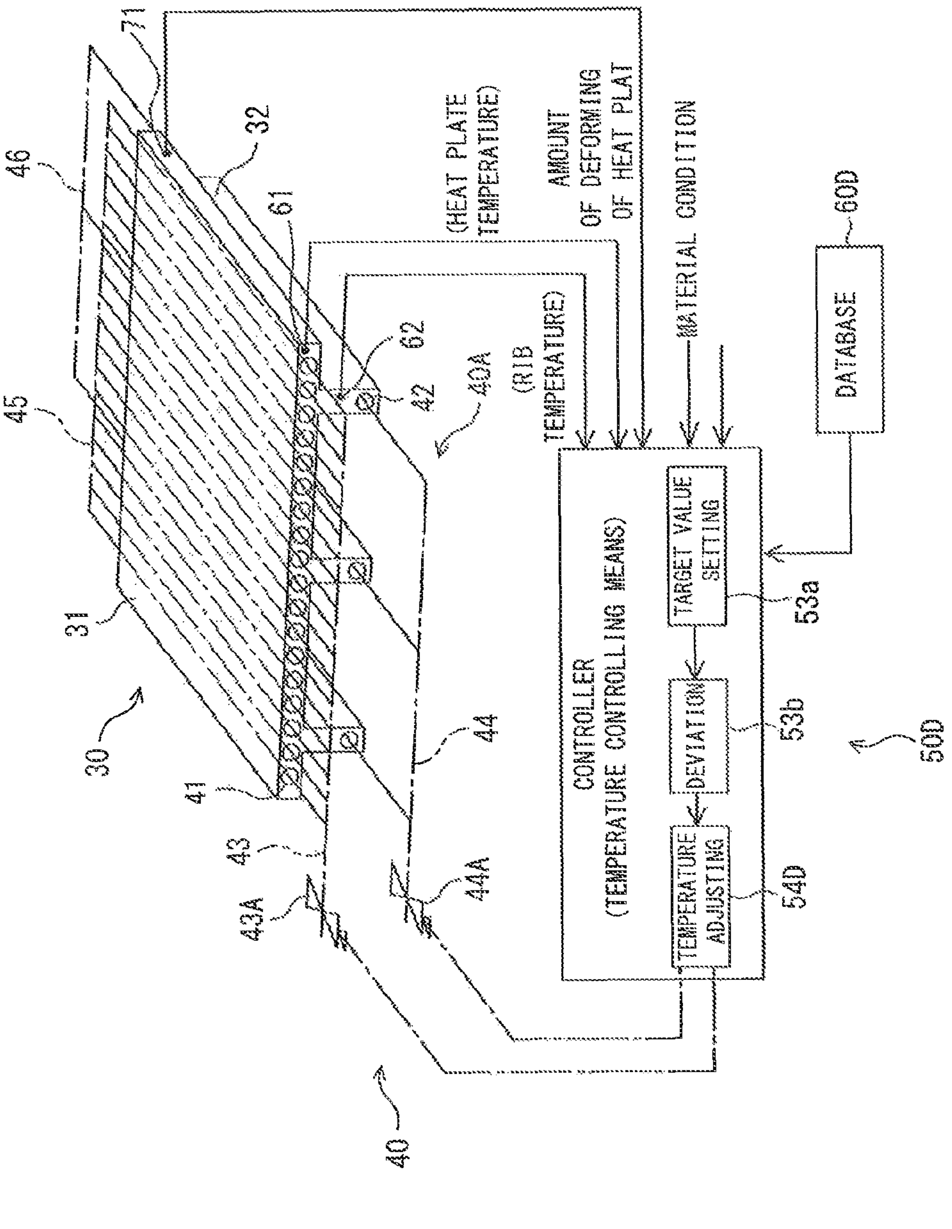
[FIG. 7] A diagram illustrating the configuration of a temperature controlling mechanism of the heat plate unit of a fourth embodiment.

FIG. 7 is a diagram illustrating a temperature controlling mechanism of the heat plate according to the fourth embodiment of the present invention. The controlling mechanism of the fourth embodiment is the same in configuration as the third embodiment, but different in condition for the controlling and in detecting means from the third embodiment. In FIG. 7, parts and element similar to those in FIG. 6 are represented by the same reference numbers and repetitious description is omitted or simplified.

The heating medium passage 42 of each rib 32 is disposed in lower vertical position of the rib 32, that is, at a shifted position largely distant from the heat plate 31 because, as the above, the distribution of the temperature of the rib 32 in the vertical direction is controlled by means of vapor passing through the corresponding heating medium passage 42 to generate the stress that causes the rib 32 to warp. Controlling the temperature at a point more distant from the heat plate 31 is less affected by the heat from the heat plate 31, and furthermore can generate a larger stress due to deviation from the center in the vertical direction of the rib 32.

The heating medium passages 41 are disposed inside the heat plate 31 at the center in the thickness direction of the heat plate 31. If the strength and other factors of the heat plate 31 permit, the heating medium passages 41 are preferably disposed in a sifted level towards the top surface (the dissipating face 31*a*) of inside the heat plate 31. The heating medium passages 41 closer to the dissipating face 31*a* of the heat plate 31 can more rapidly supply heat to the dissipating face 31*a* even when the fiberboard sheet 5A takes heat from the dissipating face 31*a*, and in addition, inhibit the temperature inclination of the heat plate 31 in the thickness direction (the vertical direction), which can reduce the load on the respective ribs 32.

The vapor inlet passages 43 and 44, the vapor outlet passages 45 and 46, and a non-illustrated vapor supplying source constitutive a vapor supplying and emitting device (heating medium supplying and emitting device) 40A which introduces vapor into the vapor inlet passages 43 and 44 from the vapor supplying source, circulates the vapor through the heating medium passages 41 and 42, and then emits the vapor through the vapor outlet passages 45 and 46.

The vapor inlet passage 43 includes a first electromagnetic pressure adjusting valve 43A which adjusts the vapor pressure of the vapor to be supplied to the respective heating medium passage 41; and the vapor inlet passage 44 includes a second electromagnetic pressure adjusting valve 44A which adjusts the vapor pressure of the vapor to be supplied to the respective heating medium passage 42. The temperature of vapor to be supplied to the respective heating medium passages 41 can be adjusted by adjusting the vapor pressure of the vapor by the first electromagnetic pressure adjusting valve 43A; and the temperature of vapor to be supplied to the respective heating medium passages 42 can be adjusted by adjusting the vapor pressure of the vapor by the second electromagnetic pressure adjusting valve 44A.

The vapor supplied to the heating medium passages 41 and 42 has a saturated vapor pressure of 1.0-1.3 Mpa and has a maximum temperature of 180-190° C. When the vapor pressure is lowered by turning down the pressure adjusting valves 43A and 44A, the temperature of the vapor declines. The degrees of opening the pressure adjusting valves 43A and 44A are correlated with the temperature of the vapor supplied to the heating medium passages 41 and 42, respectively. The pressure adjusting valves 43A and 44A and the vapor supplying and emitting device (heating medium supplying and emitting device) collectively constitute temperature controlling means 40 that controls the temperatures of the heat plate 31 and the ribs 32.

In order to automatically control the pressure adjusting valves 43A and 44A, there is provided a controller 50A, which is one of the elements constituting the temperature controlling means 40. Furthermore, there is disposed a database 60A which stores material condition and production condition of the double-faced corrugated fiberboard 5 and optimum degrees of opening (i.e., amounts of controlling) of the respective pressure adjusting valves (temperature adjusting factors) 43A and 44A related to the temperatures of the heat plate 31 and the ribs rib 32 to inhibit warp of the double-faced corrugated fiberboard under the material condition and the production condition in association with each other. Optimum degrees of opening of the pressure adjusting valve 43A and 44A are obtained through experiments under various material conditions and production conditions, and the obtained optimum degrees are stored in the database 60A.

Here, the material, condition of the double-faced corrugated fiberboards 5 includes, for example, the qualities and the thicknesses of paper to the linerboards 1 and 4 and the corrugated medium 2, the quality and ratio of water to paste of the glue used for gluing, the structure of the double-faced corrugated fiberboard 5. The production condition of the double-faced corrugated fiberboards 5 includes, for example, a rate of producing and environment (e.g., temperature and humidity) of producing.

The controller 50A includes: a function (control amount setting means) 51 that sets, upon input of the material condition and the production condition of the double-faced corrugated fiberboards amounts of controlling (i.e., the degrees of opening of the pressure adjusting valves 43A and 44A) associated with the input material condition and production condition with reference to the database 60A; and a function (temperature affecting factor controlling means or temperature adjusting means) 52 that controls the degrees of opening of the pressure adjusting valves 43A and 44A serving as temperature affecting factors respectively of the heat plate 31 and the ribs 32, using the amounts of controlling set by the control amount setting means 51. The control amount setting means 51 and the temperature affecting factor controlling means 52 are realized by means of software.

(Action and Effect)

With the above configuration of the heat plate unit of the first embodiment, upon input of the material condition and the production condition of the double-faced corrugated fiberboards 5, the controller 50A sets amounts of controlling (i.e., degrees of opening of the pressure adjusting valves 43A and 44A) associated with the input material condition and production condition with reference to the database 60. On the basis of the set amounts of controlling, the degrees of opening of the pressure adjusting valves 43A and 44A serving as temperature affecting factors of the heat plate 31 and the ribs 32 are controlled, respectively.

The vapor adjusted by adjusting the degree of opening of the pressure adjusting valve 43A is supplied to the heating medium passages 41 inside the heat plate 31, so that, even when the fiberboard sheet 5A takes heat from the dissipating face 31*a* of the heat plate 31, heat is rapidly supplied to the dissipating face 31*a*. This inhibits the heat plate 31 from having a temperature inclination in the thickness direction (i.e., the vertical direction) and thereby inhibits the heat plate 31 from warping to form a downward convex in the width direction. However, the inhibiting from warping has a limitation and consequently, the heat plate 31 may still have warp in the form of a downward convex or may have a stress corresponding to a temperature inclination to warp to conversely form an upward convex.

In the meantime, the vapor adjusted by adjusting the degree of opening of the pressure adjusting valve 44A is supplied to the heating medium passage 42 inside the rib 32 to cause to each rib 32 to have an uneven temperature distribution in the vertical direction, which provides the rib 32 to stress generating warp of an upward convex or a downward convex capable of canceling the stress caused in the heat plate 31. Consequently, warp of the heat plate 31 can be highly accurately inhibited. In particular, even when the material condition and the production condition of the double-faced corrugated fiberboard 5 vary, controlling suitable for each individual condition is carried out, so that warp of the heat plate 31 can be inhibited under various conditions with high accuracy.

Second Embodiment:

Next, a second embodiment of the present invention will now be described with reference to a drawing.

Figure 5:
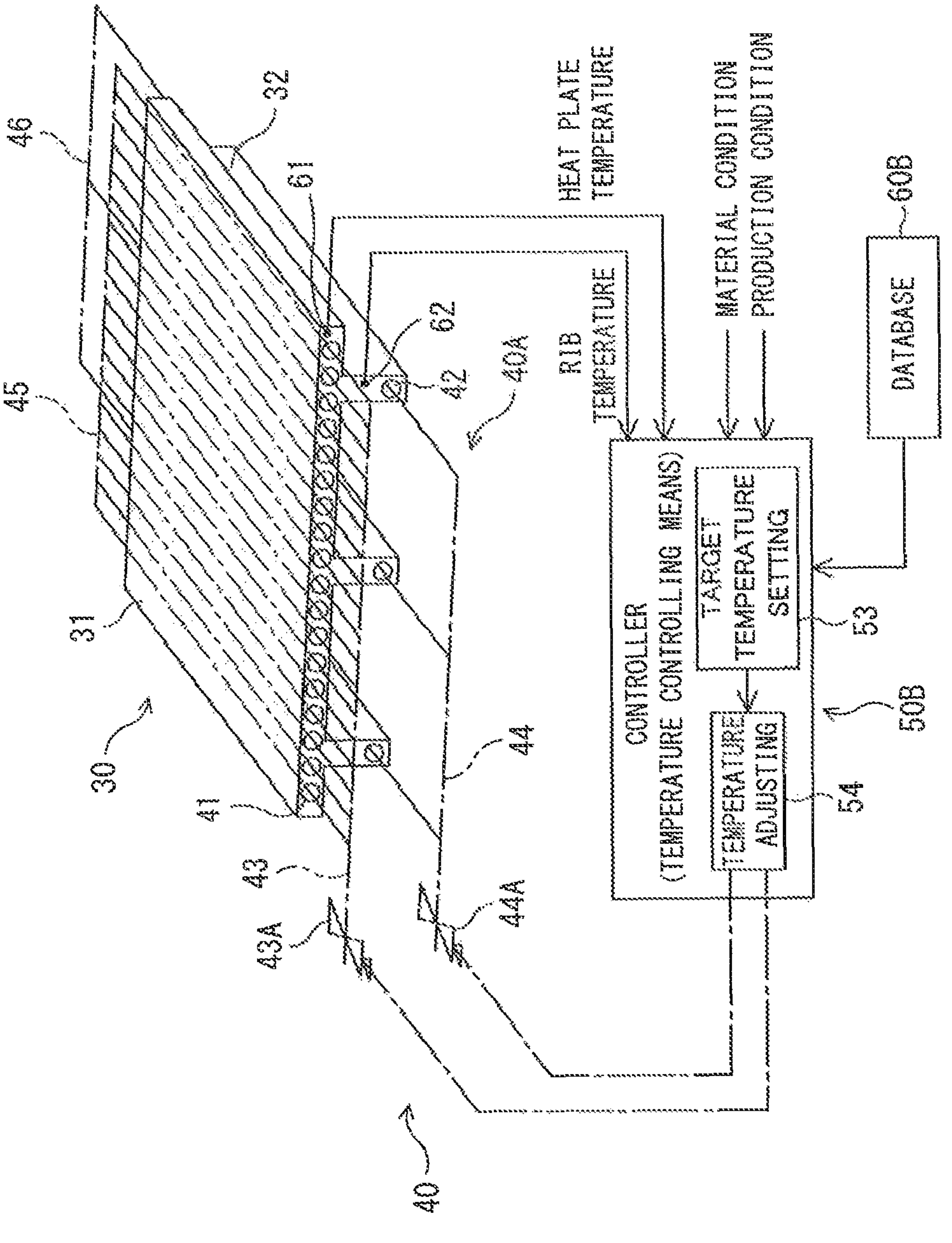
[FIG. 5] A diagram illustrating the configuration of a temperature controlling mechanism of the heat plate unit of a second embodiment.

FIG. 5 is a diagram illustrating a temperature controlling mechanism of the heat plate unit according to the second embodiment of the present invention. The second embodiment has heat plate units same in configuration as those of the first embodiments, but has a temperature controlling mechanism different from that of the first embodiment.

Specifically, as illustrated in FIG. 5, a database 60B stores the material condition and the production condition of the double-faced corrugated fiberboards 5 and the optimum target temperatures of the heat plate 31 and the ribs 32 that inhibit the double-faced corrugated fiberboards 5 from warping under the material condition and the production condition in association with each other.

The heating medium passages 41 inside the heat plate 31 extend from one end to the other end in the width direction thereof, similarly to the heating medium passages 42 inside the respective ribs 32, and are parallel to one another. At one end in the width direction, the vapor inlet passage 43 is coupled to the respective heating medium passages 41 so as to communicate with the heating medium passages 41, and the vapor inlet passage 44 is coupled to the respective heating medium passages 42 so as to communicate with the heating medium passages 42. At the other end in the width direction, the vapor outlet passage 45 is coupled to the respective heating medium passages 41 so as to communicate with the heating medium passages 41, and the vapor outlet passage 46 is coupled to the respective heating medium passages 42 so as to communicate with the heating medium passages 42.

With the above configuration of the heat plate unit of the second embodiment, upon input of the material condition and the production condition of the double-faced corrugated fiberboards 5, the controller 50B adjusts the degree of opening the pressure adjusting valves 43A and 44A through feedback control based on the respective target temperatures set by the target temperature setting means 53 and temperatures of the heat plate 31 and the ribs 32 that the temperature sensors 61 and 62 detect such that the temperatures of the heat plate 31 and the ribs 32 come to be the respective target valves.

The temperature of the heat plate 31 adjusted by adjusting the degree of opening of the pressure adjusting valve 43A inhibits the heat plate 31 from having a temperature inclination in the thickness direction (i.e., the vertical direction) and thereby inhibits the heat plate 31 from warping to form a downward convex in the width direction. However, the inhibiting from warping has a limitation and consequently, the heat plate 31 may still have warp of a downward convex or may have a stress corresponding to a temperature inclination to warp to conversely form an upward convex.

In the meantime, the temperature of the ribs 32 adjusted by adjusting the degree of opening of the pressure adjusting valve 44A causes the ribs 32 to have an uneven temperature distribution in the vertical direction, which provides the rib 32 with stress generating warp of an upward convex or a downward convex capable of canceling the stress caused in the heat plate 31. Consequently, warp of the heat plate 31 can be inhibited with high accuracy. In particular, even when the material condition and the production condition of the double-faced corrugated fiberboard 5 vary, controlling suitable for each individual condition is carried out, so that warp of the heat plate 31 can be inhibited under various conditions with high accuracy.

Third Embodiment:

Next, a third embodiment of the present invention will now be described with reference to a drawing.

FIG. 6 is a diagram illustrating a temperature controlling mechanism according to the third embodiment of the present invention. The controlling mechanism of the third embodiment is the same in configuration as the second embodiment, but different in condition for the controlling and in detecting means from the second embodiment. In FIG. 6, parts and element similar to those in FIG. 5 are represented by the same reference numbers and repetitious description is omitted or simplified.

As illustrated in FIG. 6, the third embodiment includes a database 60C that stores data different from those of the first and the second embodiments. The controller 50C includes functions of: target value setting means 53*a*; deviation calculating means 53*b*; and temperature adjusting means or temperature affecting factor controlling means) 54C that controls the degrees of the opening of the pressure adjusting valves 43A and 44A. These functions are realized by means of software.

The database 60C stores association (first association) of an amount of deformation corresponding to warp of the heat plate 31 with optimum amounts of controlling the temperature affecting factors of the heat plate 31 and the ribs 32 which cause the temperatures of the heat plate 31 and the ribs 32 to approach target values that inhibit the heat plate 31 to have warp.

Specifically, an amount of warp of the heat plate 31 when the heat plate 31 and the ribs 32 are at respective reference temperatures (e.g., unheated normal temperatures or predetermined heat temperatures) is calculated and the deviation of the calculated amount of warp from a target value is calculated. Adjusting the temperatures of the heat plate 31 and the ribs 32 cancels the deviation. The association of the deviation with an amount of adjusting the temperatures of the heat plate 31 and the ribs 32 from the reference temperatures can be obtained through previous experiments.

In this embodiment, an amount of adjusting the temperatures of the heat plate 31 and the ribs 32 from the reference temperatures means amounts of adjusting the pressure adjusting valves 43A and 44A serving as temperature affecting factors that affect the temperatures of the heat plate 31 and the ribs 32. These amounts of the adjusting the pressure adjusting valves 43A and 44A are amounts of varying the degrees of opening of the pressure adjusting valves 43A and 44A or the degrees of opening thereof.

For the above, the third embodiment stores association (the first association) of a deviation of an amount of deformation from the target value with the amounts of controlling the pressure adjusting valves 43A and 44A (amounts of varying the degrees of opening or the degrees of opening themselves) serving as amounts of adjusting temperatures of the heat plate 31 and the ribs 32 from the reference temperatures, which association is derived through previous experiments.

There are further provided temperature sensors (temperature detecting means) 61 and 62 that respectively detect temperature of the heat plate 31 and ribs 32.

The controller 50B includes a function (target temperature setting means) 53 that, upon input of material condition and production condition, sets respective target temperatures with reference to the association stored in the database 60B; and a function (temperature adjusting means) 54 that increases or decreases the degree of opening the pressure adjusting valves 43A and 44A through feedback control based on the respective target temperatures set by the target temperature setting means 53 and temperature of the heat plate 31 and the ribs 32 that the temperature sensors 61 and 62 detects such that the temperatures of the heat plate 31 and the ribs 32 come to be the respective target temperatures. The functions of the target temperature setting means 53 and the temperature adjusting means 54 are realized by means of software An amount δ of displacement measured by the heat-plate deforming amount sensor 71 is an amount of deforming corresponding to warping, as discussed above. In order to maintain the state of warping at a target state, the amount δ of displacement (the amount of deformation) is adjusted to a target value associated with the target state.

The target state of warping, i.e., the target value of the amount δ of displacement (the amount of deformation), may be input by the operator. Alternatively, a target value of an amount δ of displacement (the amount of deformation) may be calculated through previous experiments under various material conditions and production conditions, and the results may be formed into a database. With this configuration, simply inputting material condition and production condition can automatically set the target value.

In the third embodiment, the database 60C further stores association (second association) of the material condition and the production condition with (the target value of) an amount δ of displacement (an amount of deformation).

The most generic target value of this case is a value that makes the warp of the heat plate 31 zero, that is the value that establishes an amount δ of displacement=0. However, the heat plate 31 having a minute warp is more effective to cause the double-faced corrugated fiberboard product to have no warp in some cases. The amount δ of displacement in these cases is a value except for zero.

The target value setting means 53*a* in the controller 50C sets the target value based on material condition and production condition input with reference to the second association.

The deviation calculating means 53*b* of the controller 50C calculates a deviation of an amount δ of displacement measured by the heat-plate deforming amount sensor 71 from the target value set by the target value setting means 53*a*.

The temperature adjusting means 54C calculates the amounts of controlling (amounts of varying the degrees of opening of the pressure adjusting valves 43A and 44A or the degrees of opening themselves) from the reference temperatures of the heat plate 31 and the ribs 32 which amounts make the deviation of the amount δ of displacement (an amount of deforming) from the target value zero with reference to the first association stored in the database 60C, and controls the respective temperature affecting factors (the pressure adjusting valves 43A and 44A) by outputting instruction values corresponding to the calculated amounts of controlling.

In this embodiment, there are provided temperature sensors (temperature detecting means) 61 and 62 that respectively detect temperatures of the heat plate 31 and ribs 32, similarly to the second embodiment. The temperature sensors 61 and 62 of this embodiment confirm that the heat plate 31 and the ribs 32 are at reference temperatures and observe abnormal temperatures of the heat plate 31 and the ribs 32, differently from the second embodiment. If, for example, the reference temperatures of the heat plate 31 and the ribs 32 are unheated (normal) temperatures or the degrees of openings of the pressure adjusting valves 43A and 44A are predetermined reference the degrees of openings, the temperature sensors can be omitted and therefore are not always necessary.

The heat plate 31 includes a heat-plate deforming amount sensor 71 that detects an amount of deforming of the heat plate 31.

The heat-plate deforming amount sensor 71 of this embodiment measures, as the amount of deforming of the heat plate 31, an amount δ of displacement at a point that remarkably displaces when the heat plate 31 warps, Specifically, when heat plate 31 warps, the center portion downwardly displaces while the both edges of the heat plate 31 upwardly displace. As the heat-plate deforming amount sensor 71, a non-contact displacement sensor (displacement detecting means) is used which measures an amount δ of displacement of one edge of the heat plate 31. An example of the heat-plate deforming amount sensor 71 is an eddy-current non- contact displacement sensor.

Controlling the temperature of the heat plate 31 by controlling the degrees of openings of the pressure adjusting valve 43A inhibits the heat plate 31 from having a temperature inclination in the thickness direction (i.e., the vertical direction) and thereby inhibits the heat plate 31 from warping to form a downward convex in the width direction. However, the inhibiting from warping has the limitation and consequently, the heat plate 31 may still have warp of a downward convex or may have a stress corresponding to a temperature inclination to warp to conversely form an upward convex.

In the mean time, controlling the temperature of the ribs 32 by controlling the degrees of openings of the pressure adjusting valve 44A causes each rib 32 to have an uneven temperature distribution in the vertical direction, which provides the rib 32 with stress generating warp of an upward convex or a downward convex capable of canceling the stress generated in the heat plate 31. Consequently, warp of the heat plate 31 can be inhibited with high accuracy under various conditions.

With the above configuration of the third embodiment, previous input of material condition and production condition causes the target value setting means 53*a* to set the target value of an amount δ of displacement (an amount of deformation) corresponding to the input material condition and material condition with reference the second association stored in the database 60C.

Then, under a state of the temperatures of the heat plate 31 and the ribs 32 at the reference temperatures (e.g. normal unheated temperatures or predetermined heating temperatures), an amount δ of displacement (an amount of deformation) of the heat plate 31 measured by the heat-plate deforming amount sensor 71 are read and the deviation calculating means 53*b* calculates a deviation of the amount δ of displacement (the amount of deformation) from the target value. The temperature adjusting means 54C calculates the amounts of controlling (amounts of varying the degrees of opening of the pressure adjusting valves 43A and 44A or the degrees of opening themselves) from the reference temperatures of the heat plate 31 and the ribs 32 which amounts make the deviation of the amount δ of displacement (an amount of deforming) from the target value zero, in other words, that makes the amount δ of displacement (the amount of warp) the target value, with reference to the first association stored in the database 60C, and controls the degrees of openings of the pressure adjusting valves 43A and 44A corresponding to the amounts of controlling (Le., the amounts of varying the degrees of opening or the degrees of openings themselves).

As a consequence, it is possible to inhibit the heat plate 31 from warping to form a downward convex in the width direction.

As illustrated in FIG. 7, the third embodiment includes a database 60D that stores data different from those of the first and the second embodiments. The controller 50D includes functions of: target value setting means 53*a*; deviation calculating means 53*b*; a temperature adjusting means 54D that increases or decreases the degrees of openings of the pressure adjusting valves 43A and 44A through the feedback control.

The database 60D stores only the second association of the third embodiment, that is, association of a target value of an amount δ of displacement (an amount of deforming) with material condition and Production condition.

The target value setting means 53*a* and the deviation calculating means 53*b* of the fourth embodiment are the same as those of the third embodiment.

Similarly to the third embodiment, the heat plate 31 includes a heat-plate deforming amount sensor (a heat-plate deforming amount detecting means) 71 that detects an amount of deforming of the heat plate 31.

After the deviation calculating means 53*b* calculates the deviation of an amount 6 of displacement (an amount of deforming) detected by the heat-plate deforming amount sensor 71 from the target value set by the target value setting means 53*a*, the temperature adjusting means 54D of this embodiment adjusts the temperatures of the heat plate 31 and ribs 32 by increasing or decreasing respective predetermined constant amounts of heat to be supplied to the heat plate 31 and the ribs 32 considering the tendency of the calculated deviation. Since amounts of beat to be supplied to the heat plate 31 and the ribs 32 respectively correspond to degrees of opening of the pressure adjusting valves 43A and 44A serving as the temperature affecting factors, the degrees of opening of the pressure adjusting valves 43A and 44A are increased or decreased by predetermined constant amounts, considering the tendency of the calculated deviation.

In other words, this embodiment reads an amount δ of displacement measured by the heat-plate deforming amount sensor 71 which amount corresponds to warp of the heat plate 31 at all times or at periodic intervals, and carries out feedback control on amounts of heat to be supplied to the heat plate 31 and the ribs 32, so that the heat plate 31 is inhibited from warping.

Here, since warp of the heat plate 31 does not always highly respond to variation in amounts of heat to be supplied to the heat plate 31 and the ribs 32, it is preferable that this responsibility is considered when the intervals of feedback are set.

Similarly to the second and third embodiments, this embodiment includes the temperature sensors (temperature detecting means) 61 and 62 that respectively detect temperatures of the heat plate 31 and ribs 32. If, for example, the reference temperatures of the heat plate 31 and the ribs 32 are unheated (normal) temperatures or the degrees of openings of the pressure adjusting valves 43A and 44A are predetermined reference degrees of openings, the temperature sensors can be omitted and therefore are not always necessary.

With the above configuration of the heat plate of the fourth embodiment, previous input of material condition and production condition causes the target value setting means 53*a* to set the target value of an amount δ of displacement (an amount of deforming) corresponding to the input material condition and material condition with reference to the second association stored in the database 60C.

Then deviation calculating means 53*b* reads an amount δ of displacement (an amount of deforming) of the heat plate 31 detected by the heat-plate deforming amount sensor 71, and calculates a deviation of the amount δ of displacement (the amount of deforming) from the target value.

The temperature adjusting means 541) increases or decreases predetermined constant amounts of heat to be supplied to the heat plate 31 and the ribs 32 considering the tendency of the calculated deviation by increasing or decreasing the degrees of opening of the pressure adjusting valves 43A and 44A by predetermined constant amounts.

Consequently, it is possible to inhibit the heat plate 31 from warping to form a downward convex along the width direction.

In the third and fourth embodiments, the databases 60C and 60D store the association (i.e., the second association) of a target value of an amount δ of displacement (an amount of deforming) with material condition and production condition of the double-faced corrugated fiberboards. Alternatively, if the target value of an amount δ of displacement (an amount of deforming) is a constant value (e.g., δ=0) and the target value is input by an operator, such databases storing the second association can be omitted.

Others:

The description is made in relation to various embodiments of the present invention. However, the present invention should by no means be limited to the foregoing embodiments, and various changes and modifications can be suggested without departing from the spirit of the present invention.

For example, the above embodiments use vapor as the heating medium, which may be replaced with other hear media, for example, oil or glycerol. The temperature adjusting means is not limited to one using these heating media, and may alternatively be an electric heater.

The temperature affecting factors such as the pressure adjusting valves 43A and 44A that controls the temperature of ribs 32 are driven by electromagnetic means, but alternatively may be a fluid-pressure actuator using a diaphragm.

The temperature of the ribs 32 may be automatically controlled or may be controlled by an operator. In the latter case, optimum degrees of opening (amounts of adjusting) of the pressure adjusting valves (temperature affecting factors) 43A and 44A for the heat plate 31 and the ribs 32 that inhibit warping of double-faced corrugated fiberboard 5 which degrees are associated with the material condition and the production condition for the production to be controlled are displayed on a screen from the database 60A; and the operator refers to the decrees of opening (amounts of adjusting) of the pressure adjusting valves (temperature affecting factors) 43A and 44A on the screen and carries out temperature control. The above manner allows the operator to appropriately control the temperatures with ease.

The present invention can use any factor capable of adjusting temperatures of the heat plate 31 and the ribs 32 as the temperature affecting factors, which therefore are not limited to the degrees of openings of the pressure adjusting valves 43A and 44A of the foregoing embodiments.

[Industrial Applicability]

According to the present invention the presence of the ribs can inhibit thermal deformation of a heat plate caused from a temperature difference even under a state where the temperature difference cannot dissolved by reducing the difference in temperature between the top surface and the bottom surface of the heat plate in a double facer that fabricates corrugated fiberboards. Thereby, the present invention successfully prohibits warp of a double-faced corrugated fiberboard in the thickness direction which warp is caused by thermal deformation of heat plates, and can improve the quality of the products.

The invention claimed is:

1. A heat plate unit for fabricating a double-faced corrugated fiberboard included in a double facer that fabricates a double-faced corrugated fiberboards by gluing a single-faced corrugated fiberboard in a swath form and a linerboard together, the heat plate, being horizontally disposed and having a top surface on which the single-faced corrugated fiberboard in a swath form and the linerboard overlapping and being glued together travels, comprising:

- a rib, disposed on a bottom surface of a heat plate, extending in a width direction of the heat plate, being coupled to the heat plate to form an integrated body, and being capable of thermal expansion; and
- temperature controlling means that controls a temperature of the heat plate and a temperature of the rib independently of each other, wherein
- the temperature controlling means is connected to a database that stores material condition and production condition of the double-faced corrugated fiberboard and optimum target temperatures of the heat plate and the rib that inhibit warp of the double-faced corrugated fiberboard in association with each other, and
- the temperature controlling means comprises
  - target temperature setting means that, upon input of the material condition and the production condition, sets the target temperatures with reference to the association stored in the database, and
  - temperature adjusting means that adjusts the temperatures of the heat plate and the rib on the basis of the target temperatures set by the target temperature setting means.

2. The heat plate unit according to claim 1, further comprising temperature detecting means that detects the temperature of the heat plate and the temperature of the rib, wherein the temperature controlling means carries out feedback control based on the temperatures of the heat plate and the rib detected by the temperature detecting means such that the temperatures of the heat plate and the rib approach the respective target temperatures.

3. A heat plate unit for fabricating a double-faced corrugated fiberboard included in a double facer that fabricates a double-faced corrugated fiberboards by gluing a single-faced corrugated fiberboard in a swath form and a linerboard together, the heat plate, being horizontally disposed and having a top surface on which the single-faced corrugated fiberboard in a swath form and the linerboard overlapping and being glued together travels, comprising:

- a rib, disposed on a bottom surface of a heat plate, extending in a width direction of the heat plate, being coupled to the heat plate to form an integrated body, and being capable of thermal expansion; and
- temperature controlling means that controls a temperature of the heat plate and a temperature of the rib independently of each other, wherein
- the temperature controlling means is connected to a database that stores material condition and production condition of the double-faced corrugated fiberboard and optimum amounts of controlling respective temperature affecting factors of the heat plate and the rib that inhibit warp of the double-faced corrugated fiberboard in association with each other, and
- the temperature controlling means comprises
  - control amount setting means that, upon input of the material condition and production condition, sets the amounts of controlling the respective temperature affecting factors with reference to the association stored in the database, and
  - temperature affecting factor controlling means that controls the temperature affecting factors of the heat plate and the rib on the basis of the control amounts set by controlling amount setting means.

4. The heat plate unit according to claim 1, further comprising a plurality of the ribs disposed in parallel on the bottom surface of the heat plate at intervals, wherein a total value of second geometrical moment of inertia in the vertical direction of the plurality of ribs is set to be larger than that of the heat plate.

5. The heat plate unit according to claim 1, wherein the rib has a length in the vertical direction twice the thickness of the heat plate or more.

6. The heat plate unit according to claim 1, wherein the heat plate and the rib are casted into the integrated body.

7. The heat plate unit according to claim 1, wherein:

the temperature controlling means comprises heating medium passages for a heating medium, disposed inside the heat plate and the rib, and a heating medium supplying and emitting device that supplies and emits the heating medium to and from the heating medium passages of the heat plate and the rib; and the heating medium supplying and emitting device is capable of controlling the temperature of the heat plate and the temperature of the rib independently of each other by controlling a state of the supplying the heating medium.

8. The heat plate unit according to claim 7, wherein:

the heating medium is vapor;

the heating medium supplying and emitting device comprises a vapor inlet passage that supplies the heating medium passages with the vapor, a first pressure adjusting valve that adjusts a pressure of the vapor that is to be supplied from the vapor inlet passage to the heating medium passage inside the heat plate, and a second pressure adjusting valve that adjusts a pressure of the vapor that is to be supplied from the vapor inlet passage to the heating medium passage inside the rib.

9. A double facer comprising a heat plate unit defined in claim 1.

* * * * *